US011539548B2

(12) United States Patent
Ou

(10) Patent No.: US 11,539,548 B2
(45) Date of Patent: Dec. 27, 2022

(54) METHOD, SYSTEM AND APPARATUS FOR SUPPRESSING CONTROLLER AREA NETWORK BUS RINGING

(71) Applicant: Microchip Technology Incorporated, Chandler, AZ (US)

(72) Inventor: Jiong Ou, Baden Wuerttenberg (DE)

(73) Assignee: Microchip Technology Incorporated, Chandler, AZ (US)

( * ) Notice: Subject to any disclaimer, the term of this patent is extended or adjusted under 35 U.S.C. 154(b) by 3 days.

(21) Appl. No.: 17/164,934

(22) Filed: Feb. 2, 2021

(65) Prior Publication Data
US 2022/0094567 A1 Mar. 24, 2022

Related U.S. Application Data

(60) Provisional application No. 63/081,966, filed on Sep. 23, 2020.

(51) Int. Cl.
*H04L 12/40* (2006.01)
(52) U.S. Cl.
CPC ............. *H04L 12/40013* (2013.01); *H04L 2012/40215* (2013.01); *H04L 2012/40273* (2013.01)
(58) Field of Classification Search
CPC .............................. H04L 12/40013
See application file for complete search history.

(56) References Cited

U.S. PATENT DOCUMENTS

| 10,693,451 | B2 * | 6/2020 | Sekiya | H04L 25/026 |
|---|---|---|---|---|
| 2006/0192663 | A1 * | 8/2006 | Bryan | B60R 16/0315 340/457.1 |
| 2009/0278597 | A1 * | 11/2009 | Zhang | H03F 3/387 330/9 |
| 2010/0289580 | A1 * | 11/2010 | Standley | H03F 3/45192 330/253 |

(Continued)

FOREIGN PATENT DOCUMENTS

EP 3214803 A1 9/2017 ............ H04L 12/40

OTHER PUBLICATIONS

International Search Report and Written Opinion, Application No. PCT/US2021/023074, 19 pages, dated Aug. 18, 2021.

(Continued)

*Primary Examiner* — Henry Tsai
*Assistant Examiner* — Christopher A Daley
(74) *Attorney, Agent, or Firm* — Slayden Grubert Beard PLLC

(57) ABSTRACT

CAN bus drive slew rate control is used to suppress ringing using bus impedance matching that is only activated during and shortly after the bus driver unit transitions from driving the bus "dominant" to "recessive". In one embodiment a bus impedance matching unit is a differential input and differential output operational trans-conductance amplifier (OTA). The differential OTA absorbs or provides the ringing current based on bus differential voltage. In another embodiment a bus impedance matching unit is a back-to-back connected $R_{ON}$ regulated transistor pair together with a gate control related circuit. Where the total $R_{ON}$ is equal to the CAN bus characteristic impedance.

24 Claims, 15 Drawing Sheets

(56) References Cited

U.S. PATENT DOCUMENTS

| | | | |
|---|---|---|---|
| 2013/0294460 A1* | 11/2013 | Hell | H04L 25/05 370/470 |
| 2016/0142043 A1* | 5/2016 | Ravula Lakshmi | H03K 3/012 327/108 |
| 2016/0211844 A1* | 7/2016 | Houck | G11C 5/06 |
| 2016/0294123 A1* | 10/2016 | Gajda | G06F 13/4081 |
| 2017/0141803 A1* | 5/2017 | Chakraborty | H04B 1/06 |
| 2017/0257140 A1* | 9/2017 | De Haas | H04L 25/0298 |
| 2018/0248542 A1* | 8/2018 | Mori | H03K 17/687 |
| 2018/0287642 A1* | 10/2018 | Hell | H03K 5/1252 |
| 2019/0158144 A1 | 5/2019 | Honda et al. | |
| 2019/0385057 A1* | 12/2019 | Litichever | H04L 63/14 |
| 2021/0226661 A1* | 7/2021 | de Haas | H04L 12/40 |

OTHER PUBLICATIONS

Mori, Hiroyuki et al., "Novel Ringing Suppression Circuit to Achieve Higher Data Rates in a Linear Passive Star CAN FD," IEEE International Symposium on Electromagnetic Compatibility, pp. 402-407, dated Sep. 1, 2014.

Partial International Search Report and Invitation to Pay Additional Fees, International Application No. PCT/US2021/023074, 11 pages., dated Jun. 28, 2021.

\* cited by examiner

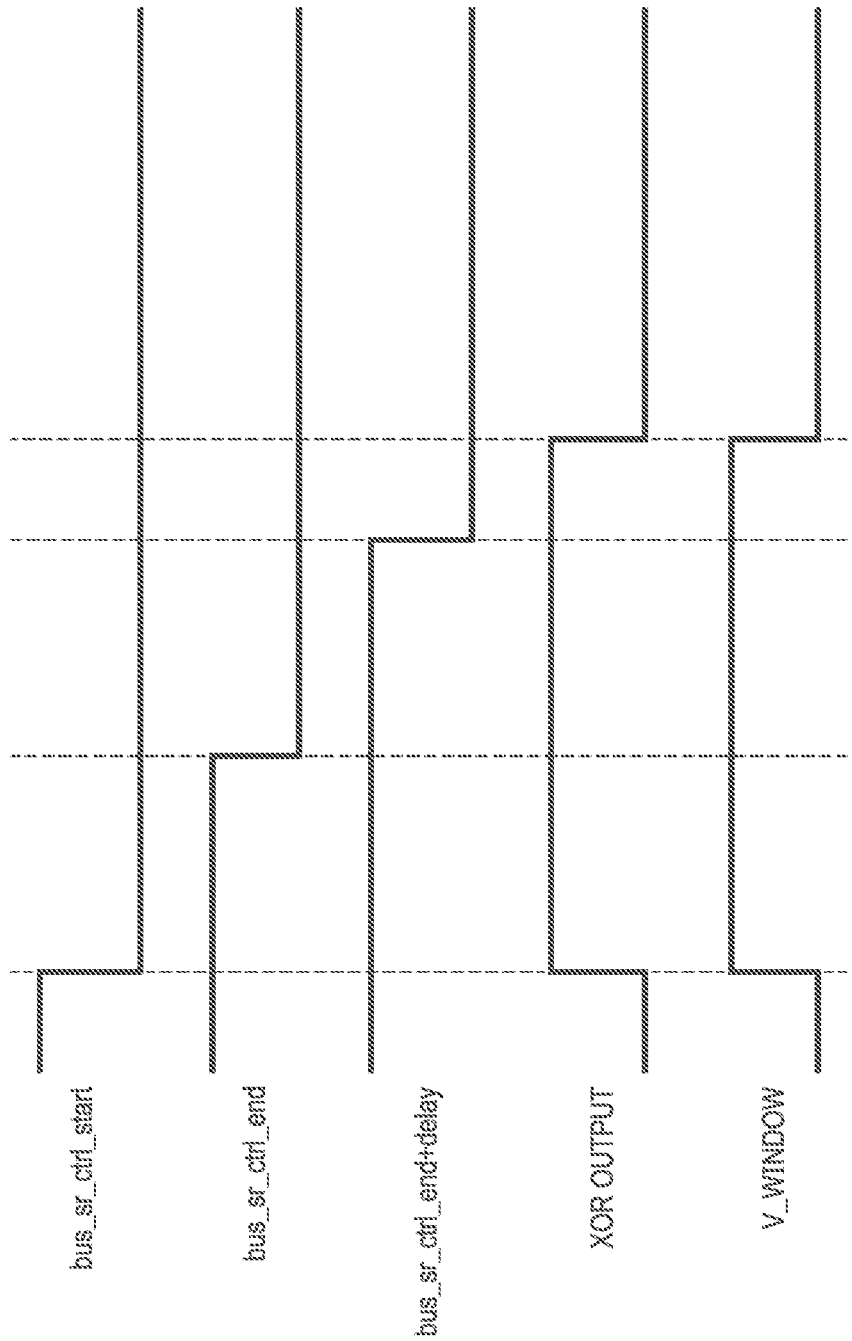

METHOD, SYSTEM AND APPARATUS FOR SUPPRESSING CONTROLLER AREA NETWORK BUS RINGING

This application claims priority to commonly owned U.S. Provisional Patent Application Ser. No. 63/081,966; filed Sep. 23, 2020; entitled "Method, System and Apparatus for Suppressing Controller Area Network Bus Ringing," which is hereby incorporated by reference herein for all purposes.

TECHNICAL FIELD

The present disclosure relates to Controller Area Network (CAN) bus interfaces, and, more particularly, to CAN bus ringing suppression with slew-rate control enhanced by controlled bus impedance matching.

BACKGROUND

Ringing is a known phenomenon and appears on Controller Area Network (CAN) bus during CAN communication, especially when the bus status transitions from "dominant" state to "recessive" state. The CAN bus uses differential wired-AND signals. Two signals, CAN high (CANH) and CAN low (CANL) are either driven to a "dominant" state with CANH greater than CANL, or not driven and pulled by passive resistors to a "recessive" state with CANH less than or equal to CANL. The CAN bus signal (bus differential voltage) is corrupted during the bus ringing, which in turn leads to communication failures. With the increasing baud rates and network size the ringing phenomenon becomes even less tolerable. In many cases, the CAN bus ringing becomes a stumbling block when moving towards higher speed CAN bus communication (for instance 5 Mbits/s or even higher).

Referring to FIG. 11, depicted are signal waveforms showing ringing on a CAN bus. FIG. 11 shows the CAN bus differential voltage (VCANH-VCANL) in dominant state and after the bus transitions to the recessive state. The CAN bus signal (bus differential voltage) is corrupted during the bus ringing phase which in turn leads to communication failures. With the increasing baud rates and network size, the ringing phenomenon becomes even less tolerable. The CAN bus ringing is a stumbling block when moving towards higher communication data rates (for instance 5 Mbits/s or even higher).

SUMMARY

Therefore, what is needed is a way to reduce CAN bus signal ringing when transitioning from a "dominant" state to a "recessive" state.

According to an embodiment, a method for reducing ringing on a controller area network (CAN) bus may comprise the steps of providing a CAN transceiver having a CAN bus driver coupled to a CAN bus, and matching impedance of the CAN bus with an impedance matching unit. According to a further embodiment of the method, the impedance matching unit may be connected to the CAN bus when the CAN bus driver may be in a CAN bus dominant state and disconnected when the CAN bus driver may be in a CAN bus recessive state. According to a further embodiment of the method, the impedance matching unit may be coupled to the CAN bus during and for a short time after the CAN bus driver transitions from driving the CAN bus from a CAN bus dominant state to a CAN bus recessive state.

According to a further embodiment of the method, the impedance matching unit may comprise an operational transconductance amplifier (OTA). According to a further embodiment of the method, the OTA may comprise differential inputs and outputs coupled to the CAN bus. According to a further embodiment of the method, the impedance matching unit may comprise a back-to-back connected Rory regulated transistor pair and a gate control circuit. According to a further embodiment of the method, may comprise the step of controlling CAN bus driver slew rate so as to reduce high frequency signals on the CAN bus. According to a further embodiment of the method, the step of controlling CAN bus driver slew rate may comprise the step of successively disabling a plurality of current sources comprising the CAN bus driver.

According to a further embodiment of the method, the step of successively disabling the plurality of current sources may provide a plurality of delay lines coupled in series and to respective ones of the plurality of current sources, wherein a disable signal may be delayed through each one of the plurality of delay lines and to the respective ones of the plurality of current sources. According to a further embodiment of the method, the step of controlling CAN bus driver slew rate may comprise the step of successively opening a plurality of parallel connected resistive switches comprising the CAN bus driver. According to a further embodiment of the method, the step of successively opening the plurality of resistive switches providing a plurality of delay lines coupled in series and to respective ones of the plurality of resistive switches, wherein a disable signal may be delayed through each one of the plurality of delay lines and to the respective ones of the plurality of resistive switches.

According to another embodiment, a system for reducing ringing on a controller area network (CAN) bus may comprise: a CAN SIC (Signal Improvement Capability) transceiver having a CAN bus driver couple-ed to a CAN bus, and an impedance matching unit selectively coupled to the CAN bus. According to a further embodiment, the impedance matching unit may be selectively coupled to the CAN bus during and for a short time after a CAN bus driver transitions from driving the CAN bus from a dominant state to a recessive state.

According to a further embodiment, the impedance matching unit may comprise an operational transconductance amplifier (OTA). According to a further embodiment, the OTA may comprise differential inputs and outputs coupled to the CAN bus. According to a further embodiment, the impedance matching unit may comprise a back-to-back connected Rory regulated transistor pair and a gate control circuit. According to a further embodiment, may comprise a slew rate circuit for controlling the CAN bus driver slew rate, whereby high frequency signals on the CAN bus may be reduced.

According to a further embodiment, the slew rate circuit may comprise: a plurality of current sources coupled in parallel; and a plurality of delay lines coupled in series and to respective ones of the plurality of current sources, wherein an enable signal may be delayed through each one of the plurality of delay lines and to the respective ones of the plurality of current sources.

According to a further embodiment, the slew rate circuit may comprise: a plurality of resistive switches coupled in parallel; and a plurality of delay lines coupled in series and to respective ones of the plurality of resistive switches, wherein an enable signal may be delayed through each one of the plurality of delay lines and to the respective ones of the plurality of resistive switches.

According to yet another embodiment, an apparatus for reducing ringing on a controller area network (CAN) bus may comprise: a CAN bus driver for driving a CAN bus, and an impedance matching unit for selectively coupling to the CAN bus. According to a further embodiment, the impedance matching unit may comprise an operational transconductance amplifier (OTA). According to a further embodiment, the impedance matching unit may comprise a back-to-back connected Rory regulated transistor pair and a gate control circuit. According to a further embodiment, may comprise a slew rate circuit for controlling CAN bus driver slew rate.

According to a further embodiment, the slew rate circuit may comprise: a plurality of current sources coupled in parallel; and a plurality of delay lines coupled in series and to respective ones of the plurality of current sources, wherein a disable signal may be delayed through each one of the plurality of delay lines and to the respective ones of the plurality of current sources.

According to a further embodiment, the slew rate circuit may comprise: a plurality of resistive switches coupled in parallel; and a plurality of delay lines coupled in series and to respective ones of the plurality of resistive switches, wherein a disable signal may be delayed through each one of the plurality of delay lines and to the respective ones of the plurality of resistive switches.

BRIEF DESCRIPTION OF THE DRAWINGS

A more complete understanding of the present disclosure may be acquired by referring to the following description taken in conjunction with the accompanying drawings wherein:

FIG. 17 illustrates a schematic signal waveform timing diagram of the impedance matching window generation circuit shown in FIG. 16, according to specific example embodiments of this disclosure.

Figure 1:
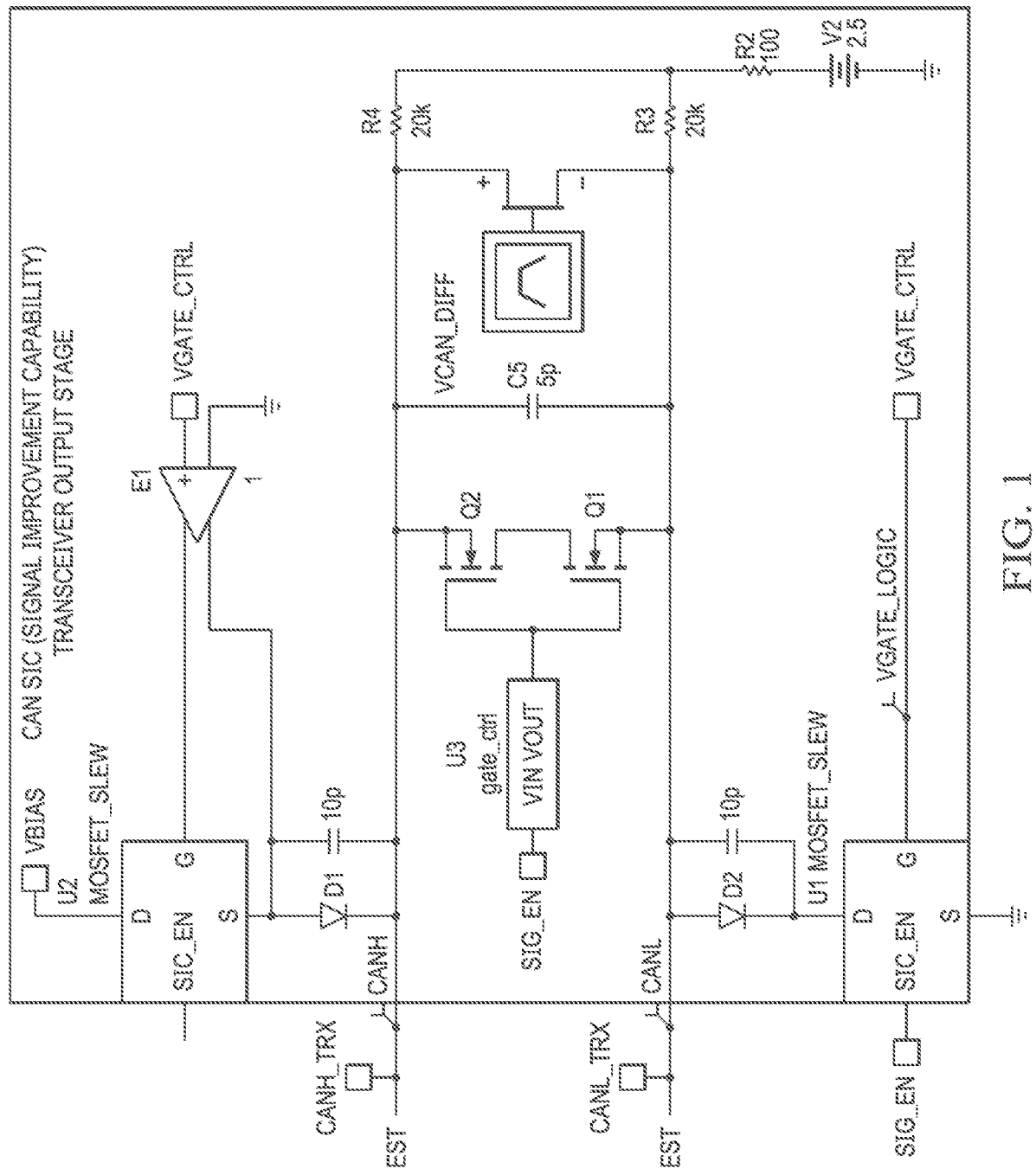
FIG. 1 illustrates a schematic diagram of a CAN transceiver output stage (back-to back transistor pair used for bus impedance matching), according to specific example embodiments of this disclosure.

While the present disclosure is susceptible to various modifications and alternative forms, specific example embodiments thereof have been shown in the drawings and are herein described in detail. It should be understood, however, that the description herein of specific example embodiments is not intended to limit the disclosure to the forms disclosed herein.

DETAILED DESCRIPTION

The high frequency digital like CAN bus signal and the increasing cable length of CAN bus networks makes the CAN bus cables (twisted pairs) behave more and more like transmission lines. Impedance mismatching in the CAN bus leads to wave reflections, which finally leads to signal ringing. Therefore, reducing high frequency signals and using bus impedance matching are the two methods that may be used to help in reducing signal wave reflections and in turn suppress the ringing phenomenon. According to the teachings of this disclosure and claimed herein, bus drive slew-rate control is presented to effectively reduce high frequency signals on the CAN bus. In addition, two types of bus impedance matching units are presented, that may be used in an integrated CAN bus transceiver for matching the CAN bus transceiver output impedance to the CAN bus impedance. The bus impedance matching unit is only activated during and for a short time after the driver of the CAN bus transceiver transitions from driving the CAN bus from a dominant mode to a recessive mode. Additional DC power loss on the CAN bus and the impact on the differential bus impedance is limited in this way.

The first embodiment of a bus impedance matching unit is a differential input and differential output operational trans-conductance amplifier (OTA). A back-to-back connected Rory regulated transistor pair together with its gate control related circuit is the second type of impedance matching unit disclosed herein. The differential OTA can absorb or provide the ringing current based on bus differential voltage and preferably the gain of the OTA, gm, should be equal to 1/(bus characteristic impedance). The regulated transistor pair together with their gate control related circuit preferably should provide a total RON equal to the bus characteristic impedance when activated. Both the bus drive slew rate control and the controlled bus impedance matching may be applied in a combined way or they may be applied individually.

Referring now to the drawings, the details of example embodiments are schematically illustrated. Like elements in the drawings will be represented by like numbers, and similar elements will be represented by like numbers with a different lower-case letter suffix.

Referring to FIG. 1, depicted is a schematic diagram of CAN SIC transceiver output stage (back-to back transistor pair used for bus impedance matching), according to specific example embodiments of this disclosure. An output stage of a CAN SIC (Signal Improvement Capability) transceiver with the described techniques for suppressing CAN bus ringing is applied. The output stage of the CAN SIC transceiver is also referred to herein as a "CAN bus driver." U1 and U2 represent two CAN bus drivers supporting slew rate control. Gate control unit U3, MOSFETs (e.g., insulated gate) Q1 and Q2 represent a controlled bus impedance matching circuit implemented as a back-to-back connected transistor pair Q1, Q2 and its gate control unit U3 that is responsible for controlling the gate voltage of Q1 and Q2. Current and voltage-based bus drivers U1 and U2 are more fully disclosed in FIGS. 12 and 13, respectively, and the descriptions thereof hereinafter.

Figure 2:
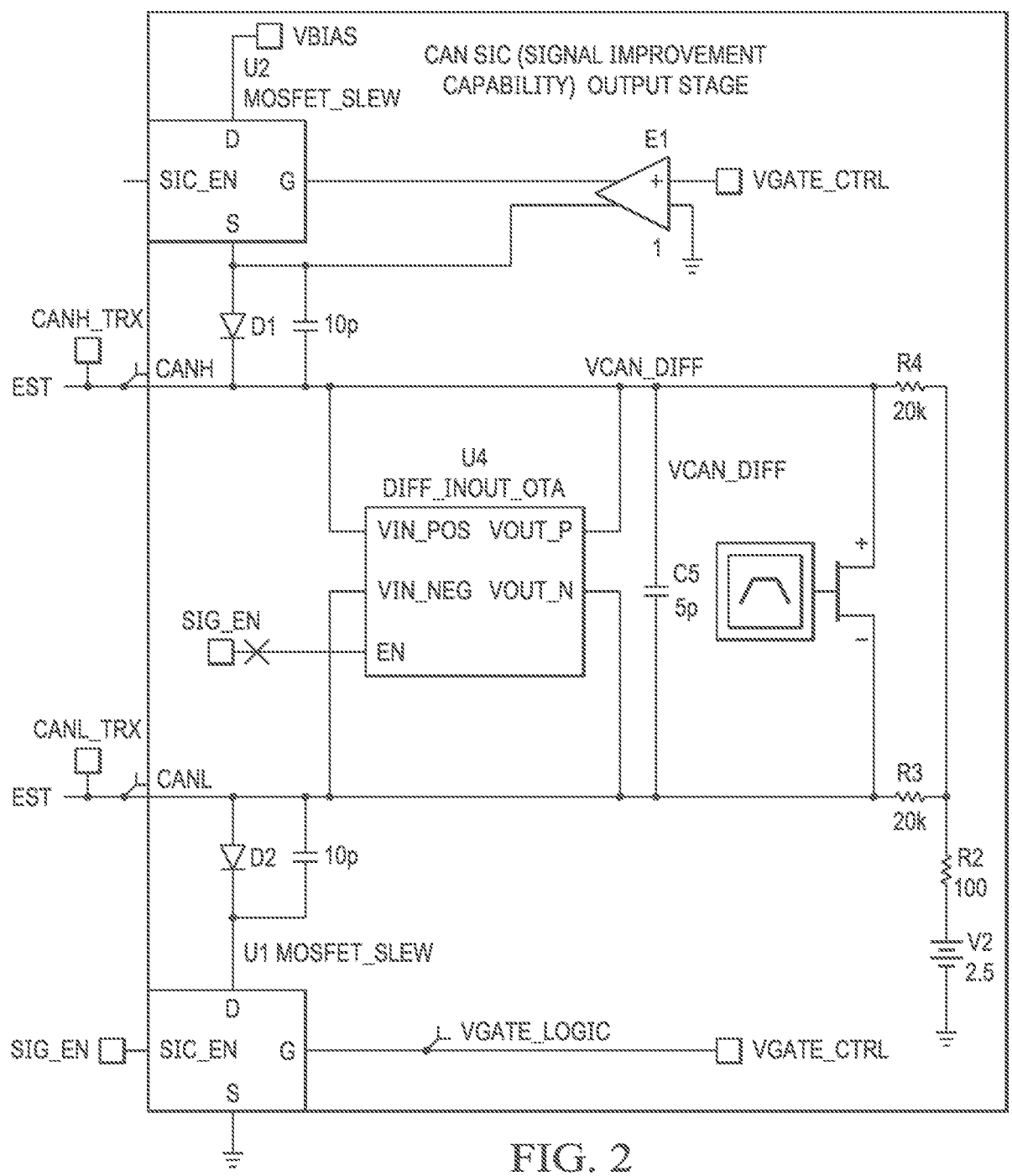
FIG. 2 illustrates a schematic diagram of CAN transceiver output stage implemented as an operational trans-conductance amplifier (OTA), according to specific example embodiments of this disclosure.
Figure 16:
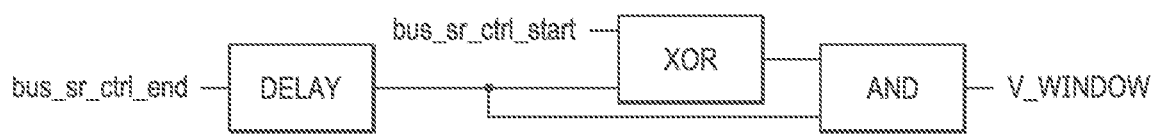
FIG. 16 illustrates a schematic block diagram of an impedance matching window generation circuit, according to specific example embodiments of this disclosure.

Referring to FIG. 2, depicted is a schematic diagram of CAN SIC transceiver output stage, where an OTA U4 is implemented for bus impedance matching in place of U3, Q1 and Q2 of FIG. 1, according to specific example embodiments of this disclosure. CAN bus impedance matching may also be implemented by using a controlled differential input/output OTA U4 as shown in FIG. 2. The bus impedance matching enable/control signal ("SIG_EN") may be generated as shown in FIGS. 1 and 2 by the bus driver unit U1/U2, as the control signal may be derived from the driver control. Operation of the SIG_EN signal generation is shown in FIGS. 16 and 17. "SIG_EN" is the "V_WINDOW".

Figure 3A:
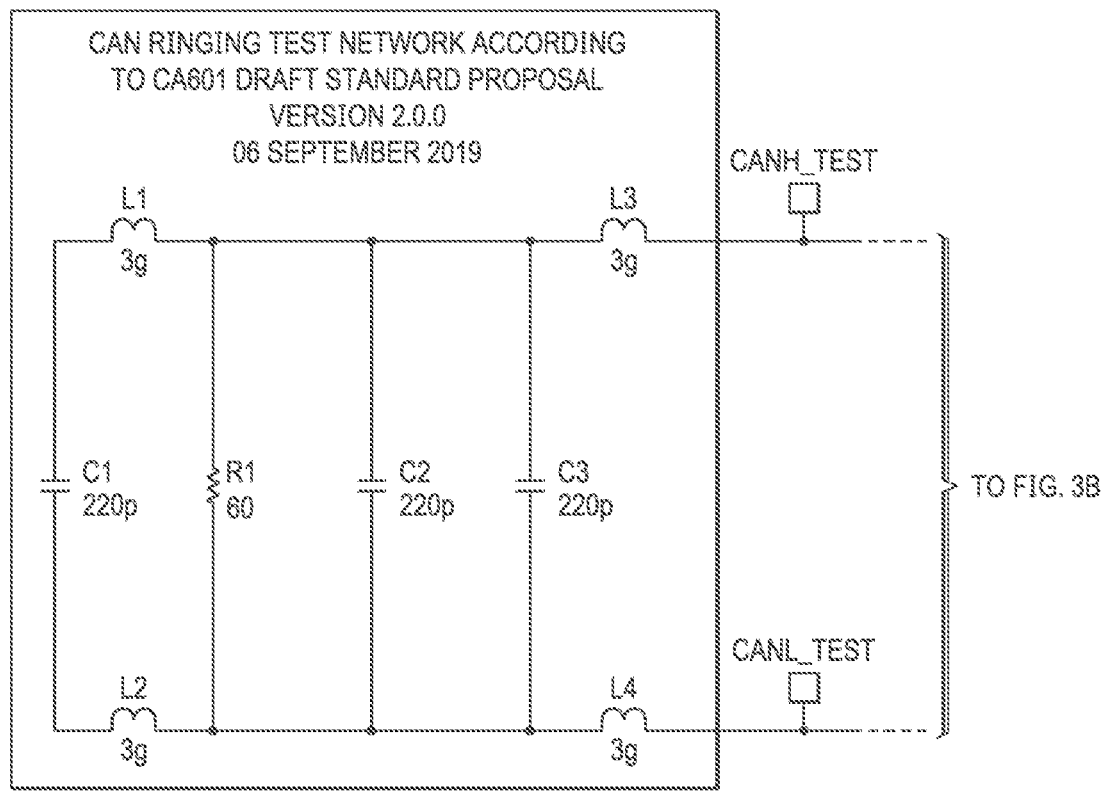
FIGS. 3A and 3B illustrate a schematic diagram of a test circuit for validating ringing suppression techniques, according to the teachings of this disclosure.
Figure 3B:
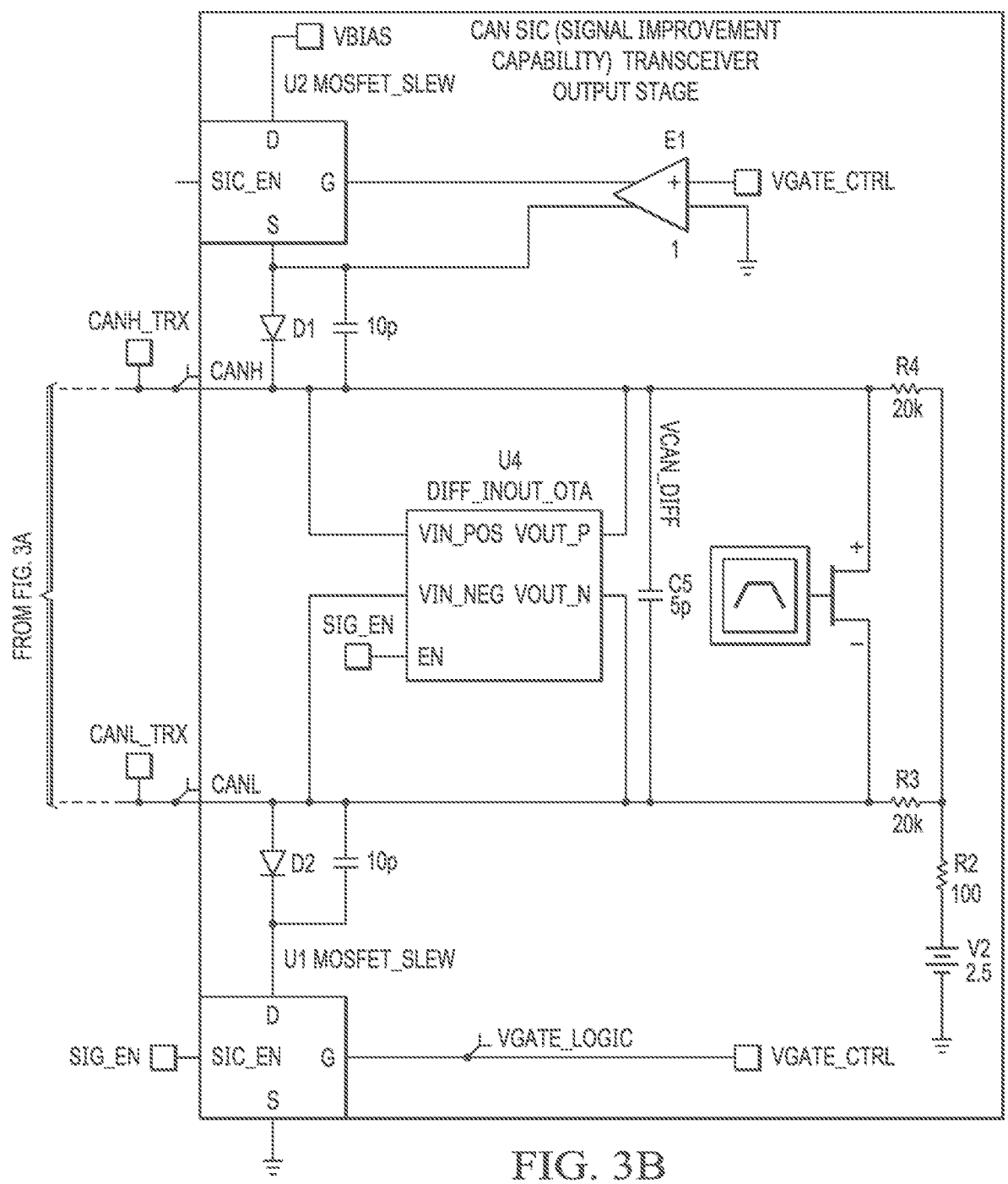

Referring to FIGS. 3A and 3B, depicted is a schematic diagram of a test circuit for validating ringing suppression techniques, according to the teachings of this disclosure. The proposed techniques disclosed herein have been validated within a simulation test bench as shown in FIG. 3. The test network was configured according to the "CiA 601 Draft Standard Proposal, Version 2.0.0, 6 Sep. 2019" available from CAN in Automation e. V. of Nuremberg, Germany.

Figure 4:
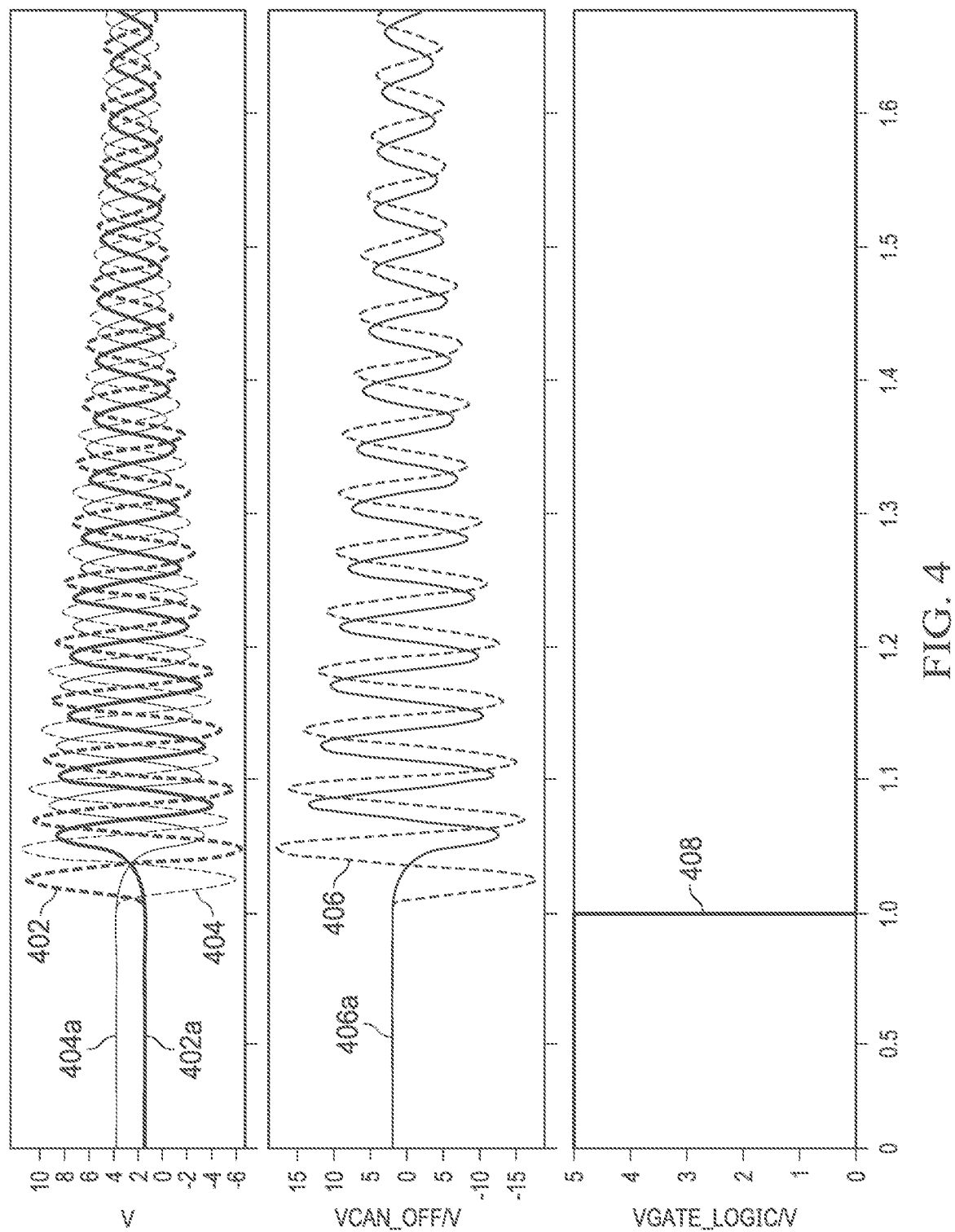
FIG. 4 illustrates signal waveforms of CAN bus signals with and without slew rate control and bus impedance matching disabled, according to the teachings of this disclosure.

Referring to FIG. 4, depicted are signal waveforms of CAN bus signals with and without slew rate control and bus impedance matching disabled, according to the teachings of this disclosure. The dotted line signal waveforms 402 and 404 (CAN bus signals CANL and CANH, respectively) in FIG. 4 show the test signal waveforms with both the slew-rate control and the bus impedance matching being disabled. The solid line signal waveforms 402a and 404a in the first row represent the CAN bus signals CANL and CANH, respectively, with the slew-rate control enabled. After the transition from dominant state into recessive state, ringing appears on the CAN bus. The signal waveforms 406 and 406a on the second row represent the differential bus voltage, without and with slew-rate control, respectively. In the dominant state, the peak amplitude is about 2.5 volts in this simulation. In recessive state, the differential voltage may swing from −18 volts to +18 volts. The signal waveform 408 in the third row represents the bus driver control voltage VGATE_CTRL of U1. The gate control voltage transition time may be around 30 nanoseconds (ns). The effect of slew rate control on reducing ringing is illustrated in FIG. 4. The signal waveforms 406 and 406a in the second row show that the maximum swing of the differential CAN bus voltage has been reduced to about +/−12V from +/−18V.

Figure 5:
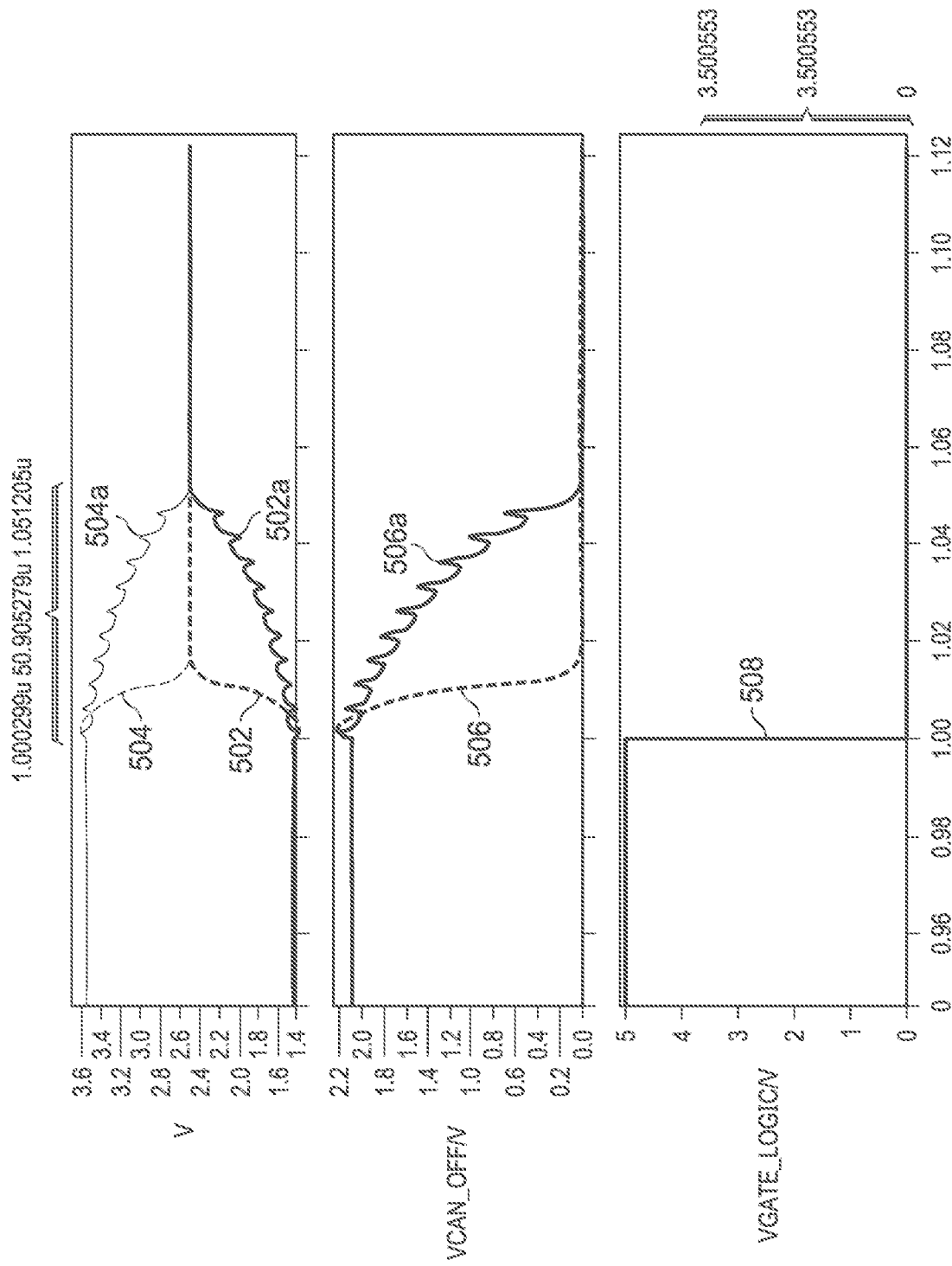
FIG. 5 illustrates signal waveforms of CAN bus signals with and without slew rate control, according to the teachings of this disclosure.

Referring to FIG. 5, depicted are signal waveforms of CAN bus signals with and without slew rate control, according to the teachings of this disclosure. FIG. 5 shows the CAN bus signal waveforms 502 and 504 on the first row represent the CANL and CANH signals, respectively, without slew rate control, and signal waveforms 502a and 504a with slew rate control. As shown in FIG. 5, the transition from the dominant to the recessive state has been slowed down to about 50 ns when the slew rate control is activated.

Figure 6:
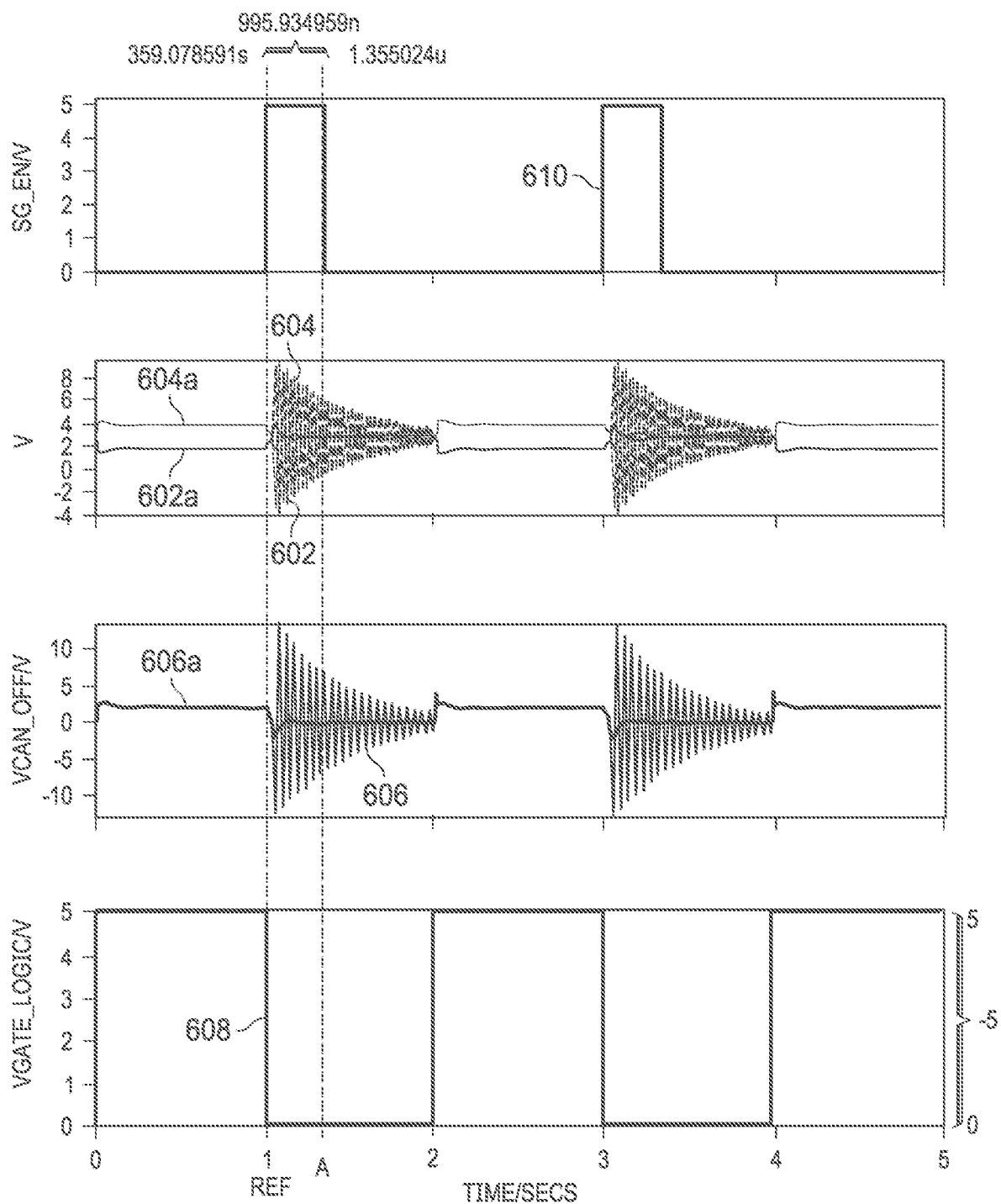
FIG. 6 illustrates a signal waveforms of CAN bus signals with and without controlled bus impedance matching (back-to-back transistor pair), according to the teachings of this disclosure.

Referring to FIG. 6, depicted are signal waveforms of CAN bus signals with and without controlled bus impedance matching, according to the teachings of this disclosure. FIG. 6 shows the test results when both slew rate control and controlled bus impedance matching (back-to-back connected transistors) are activated. As shown by the signal waveform 610 on the first row, the controlled bus impedance matching is activated for about 360 ns starting from the transition from dominant to recessive state. The differential bus voltage ringing (waveforms 602a and 604a) has almost been completed suppressed with the first negative peak less than minus one (−1) volt. The positive effect of CAN bus ringing suppression via slew rate control and controlled bus impedance matching using the back-to-back connected transistor pair or controlled differential input/output OTA circuit configurations have been validated via the simulation test bench and simulation results. The OTA circuit and the transistor pair Q1, Q2 are "controlled" in that it is only enabled for a defined time window, otherwise it is disabled.

Figure 7:
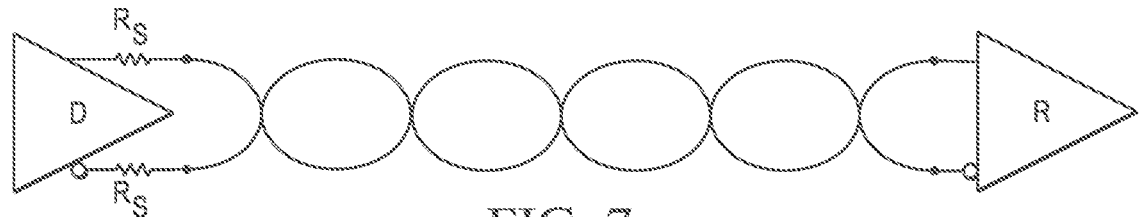
FIGS. 7-9 illustrate schematic diagrams of typical prior art transmission line terminations.
Figure 8:
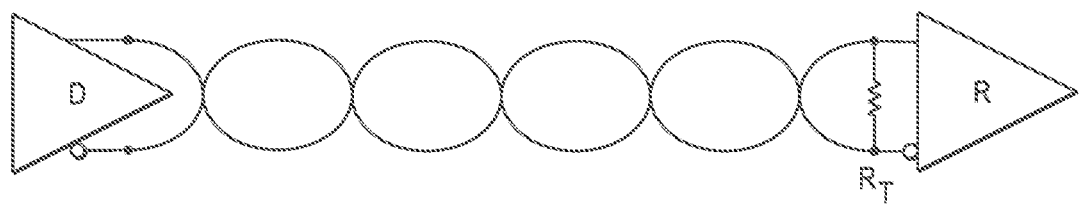
Figure 9:
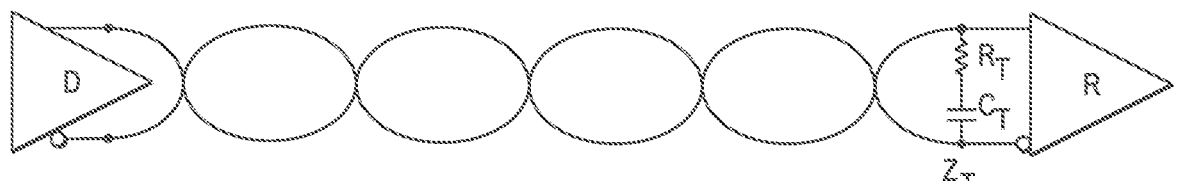

Referring to FIGS. 7-9, depicted are schematic diagrams of typical prior art transmission line terminations. Transmission line termination is a common technique applied for reducing reflections on transmission lines. The high-speed CAN bus network uses twisted pair cable. Therefore, common transmission line differential signal termination techniques, theoretically, can be applied to suppress ringing on the CAN bus. Serial termination, as shown in FIG. 7 is one common termination configuration. The termination resistors (Rs) are chosen such that their value plus the impedance of the driver's output impedance equal the characteristic impedance of the cable (e.g., 120 Ohms in the case of the CAN bus). However, the serial termination configuration shown in FIG. 7 is not applicable to use with a CAN bus. In dominant state, the output impedance of a CAN transceiver plus Rs needs to be sufficiently lower than the 60 Ohm bus differential resistance to create the requested differential voltage on the CAN bus. On the other side, the output impedance of a CAN transceiver becomes very high (kilohms) in recessive state, which dominates the output impedance of a transceiver. The termination resistance Rs will become negligible comparing to the output impedance of the transceiver in recessive state and will not have any effect.

FIG. 8 shows a second type of transmission line termination called "parallel termination configuration." Proper parallel termination resistor RT can help substantially eliminate reflections. However, the power dissipated by the driver also increases substantially with the addition of the parallel connected resistor RT, which represents the big disadvantage of this termination configuration. The parallel termination resistor also impacts the bus differential resistance (60 Ohm typical), which makes the parallel termination not applicable for use with a CAN bus. AC termination shown in FIG. 9 is another type of transmission line termination which can minimize DC loop current (driver power dissipation). At high frequencies, the capacitor CT acts as a short circuit and effectively only the termination resistor is connected to the bus. At low frequencies, the capacitor has high impedance which blocks the DC loop current. The main disadvantage of this configuration is the size of the capacitor. It is unrealistic to integrate the capacitor into an integrated circuit. Also, the capacitance of capacitor CT negatively impacts the network capacitances. At the same time, the value of capacitor CT is dependent on the network size (length of cables) and it is difficult to fix the value of the integrated capacitor for all possible network sizes.

Figure 10:
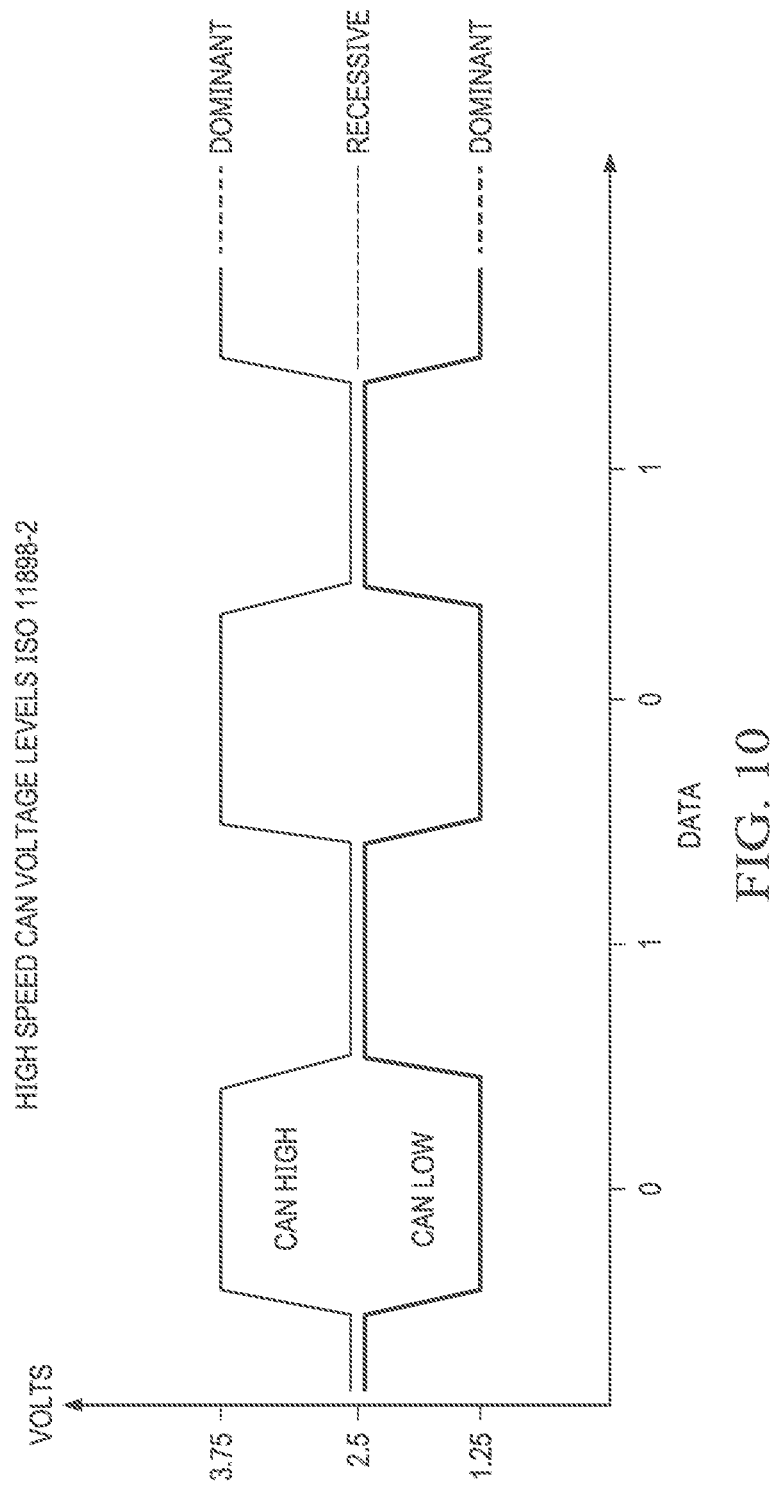
FIG. 10 illustrates schematic simulation waveforms of ideal CAN bus signals.

Referring to FIG. 10, depicted are schematic simulation waveforms of ideal CAN bus signals. Ringing is a known phenomenon that appears on the CAN bus during CAN communication, especially when the bus status is transiting from "dominant" state to "recessive" state. FIG. 10 shows the ideal CAN bus signals. In normal operation, the bus dominant state differential voltage shall be between 0.9 volts and 5 volts. In recessive state, the bus differential signal shall be between −1 volts and 0.5 volts.

The high frequency digital like CAN bus signal together with the increasing length of cables used in a CAN bus network make the CAN bus cables (twisted pair in common mode) behave more and more like transmission lines. Impedance mismatching, at connectors, long stubs, without limitation, in a CAN bus leads to wave reflections, which finally leads to the signal ringing. Therefore, reducing high frequency signals by controlling signal transition time to reduce the high frequency waveform components and doing bus impedance matching are two methods that can help in reducing reflections and in turn suppressing the signal ringing phenomenon.

Figure 12:
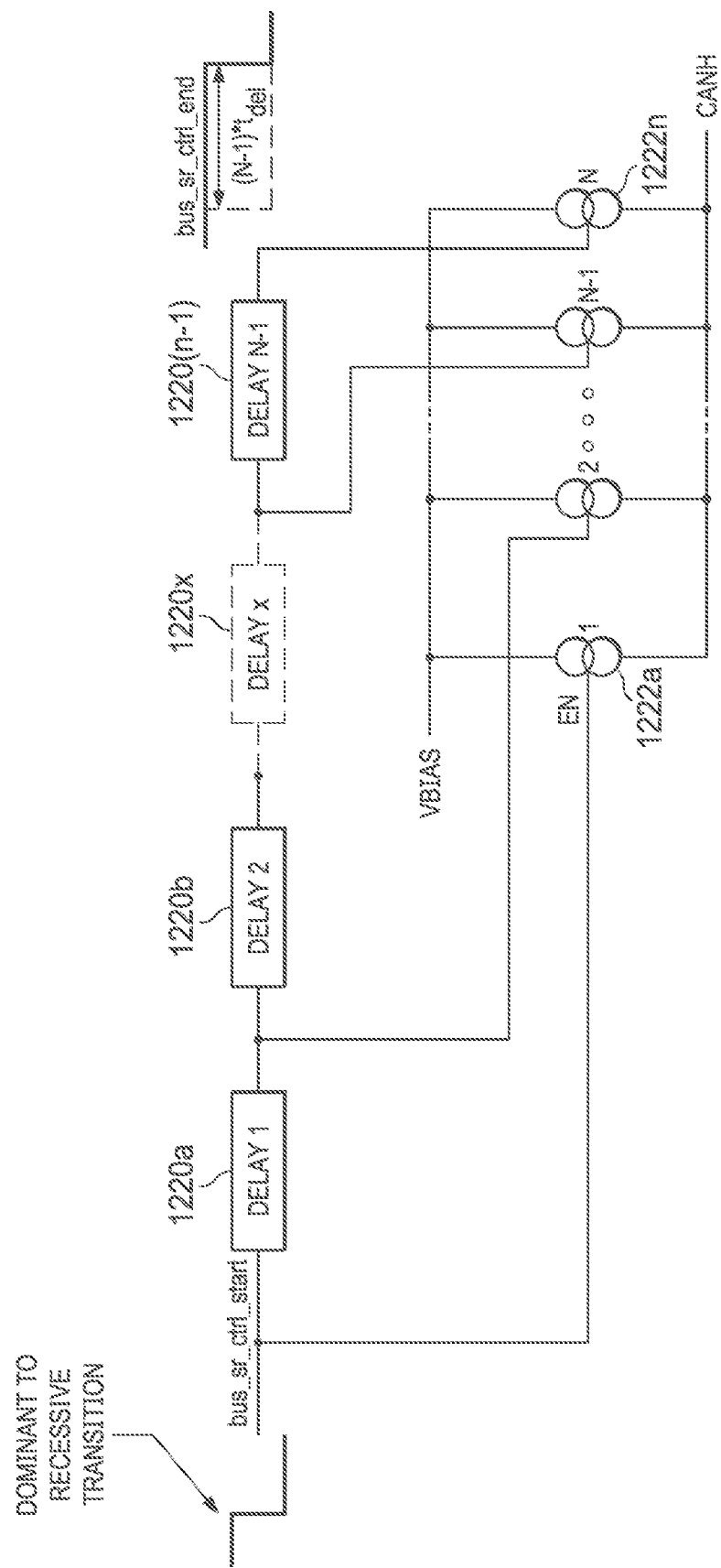
FIG. 12 illustrates a schematic block diagram of a current-based bus driver and slew rate control, according to specific example embodiments of this disclosure.

Referring to FIG. 12, depicted is a schematic block diagram of a current-based bus driver and slew rate control, according to specific example embodiments of this disclosure. A plurality of current sources 1222 coupled in parallel may be sequentially enabled using a plurality of delay lines 1220 connected in series to ramp up the current drive to the CAN bus in a controlled manner.

Figure 13:
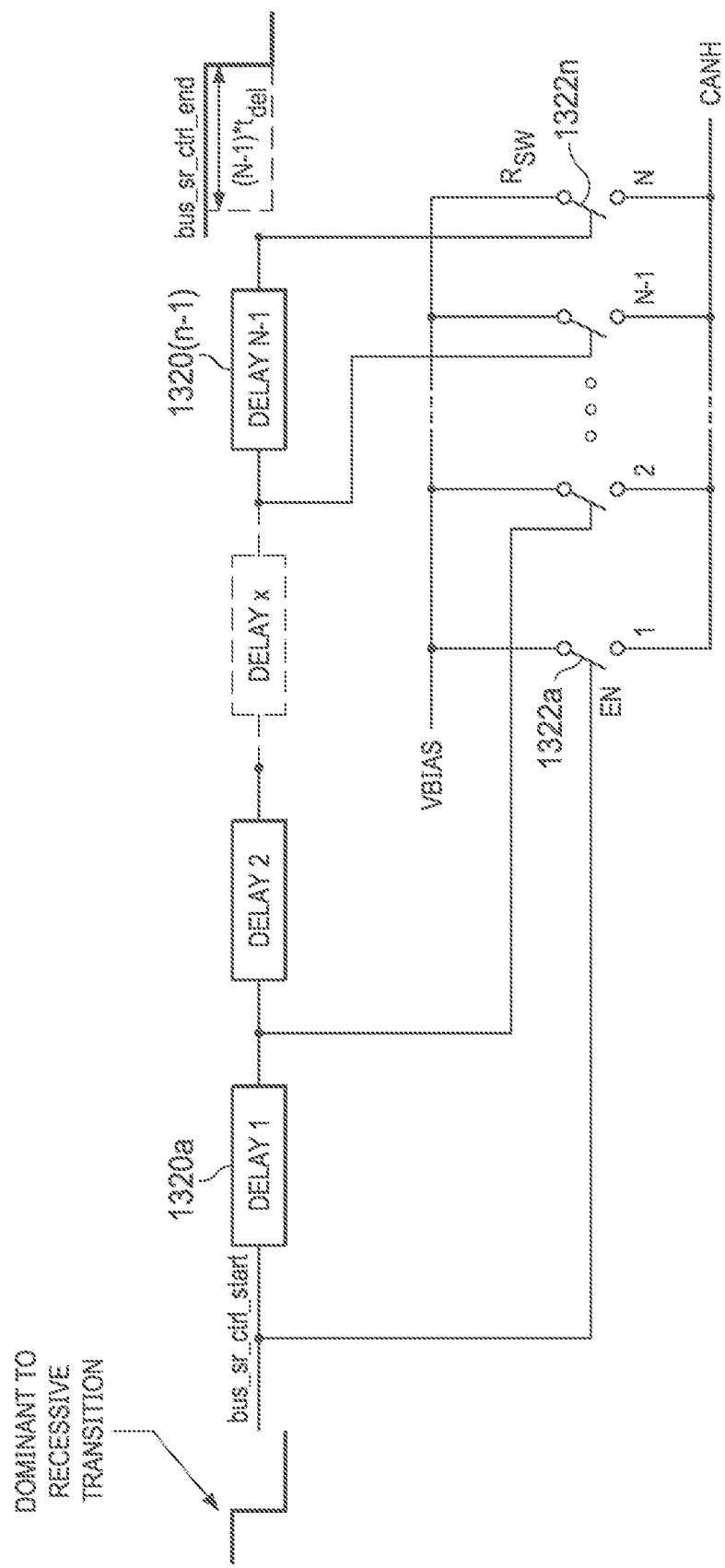
FIG. 13 illustrates a schematic block diagram of a voltage-based bus driver and the slew rate control, according to specific example embodiments of this disclosure.

Referring to FIG. 13, depicted is a schematic block diagram of a voltage-based bus driver and the slew rate control, according to specific example embodiments of this disclosure. A plurality of transistor switches 1322 (1 to N) coupled in parallel may be sequentially enabled using a plurality of delay lines 1320 connected in series to ramp up the current drive to the CAN bus in a controlled manner by decreasing the resistance between VBIAS and CANH (and/or CANL) bus. FIG. 13 shows a voltage-based bus driver which is built as a set of parallel connected transistor switches 1 to N. Each switch 1 to N having a resistance Rsw. Slew rate control can be realized by opening or closing the transistor switches 1322 (1 to N) successively, thereby changing the parallel connected switch resistances Rsw. Transistor switches 1 to N are each enabled when the respective control input is in a first state (illustrated as in a high state), and disabled when the respective control input is in a second state (illustrated as in a low state).

Referring back to FIG. 1, illustrated conceptually is the output stage of a CAN SIC (Signal Improvement Capability) transceiver with the described techniques for suppressing CAN bus ringing applied. U1 and U2 represent two bus drivers supporting slew rate control. U3, Q1 and Q2 represent a circuit for controlled bus impedance matching implemented as a back-to-back connected transistor pair and its gate control unit U3. This bus impedance matching can also be implemented by a controlled OTA as shown in FIG. 2. The bus impedance matching enable/control signal ("SIG_EN") is generated, as shown in FIGS. 1 and 2, by the bus driver unit U1/U2, as the bus impedance matching control signal to Q1 and Q2 is derived from the gate control unit U3.

The core idea of bus drive slew rate control is to control the speed of voltage change (dv/dt) on CANH and CANL during bus status transitions in a way that the high frequency signals on the bus are reduced. The implementation of the slew rate control is dependent on the type/topology of the bus driver. U1 and U2 in FIGS. 1 and 2 may be a current-based bus driver built as a set of parallel connected current sources 1 to N as shown in FIG. 12, each of which are enabled when the respective control input is in a first state (illustrated as in a high state) and disabled when the respective control input is in a second state (illustrated as in a low state). During the transition from driving CAN bus dominant to driving CAN bus recessive, the current sources are disabled successively, which slows down the change of the driver output impedance and reduces dv/dt on the bus nodes. A minimum dv/dt on the bus nodes preferably may be configured in a way that it will not lead to communication failure on all receiver sides.

Figure 14:
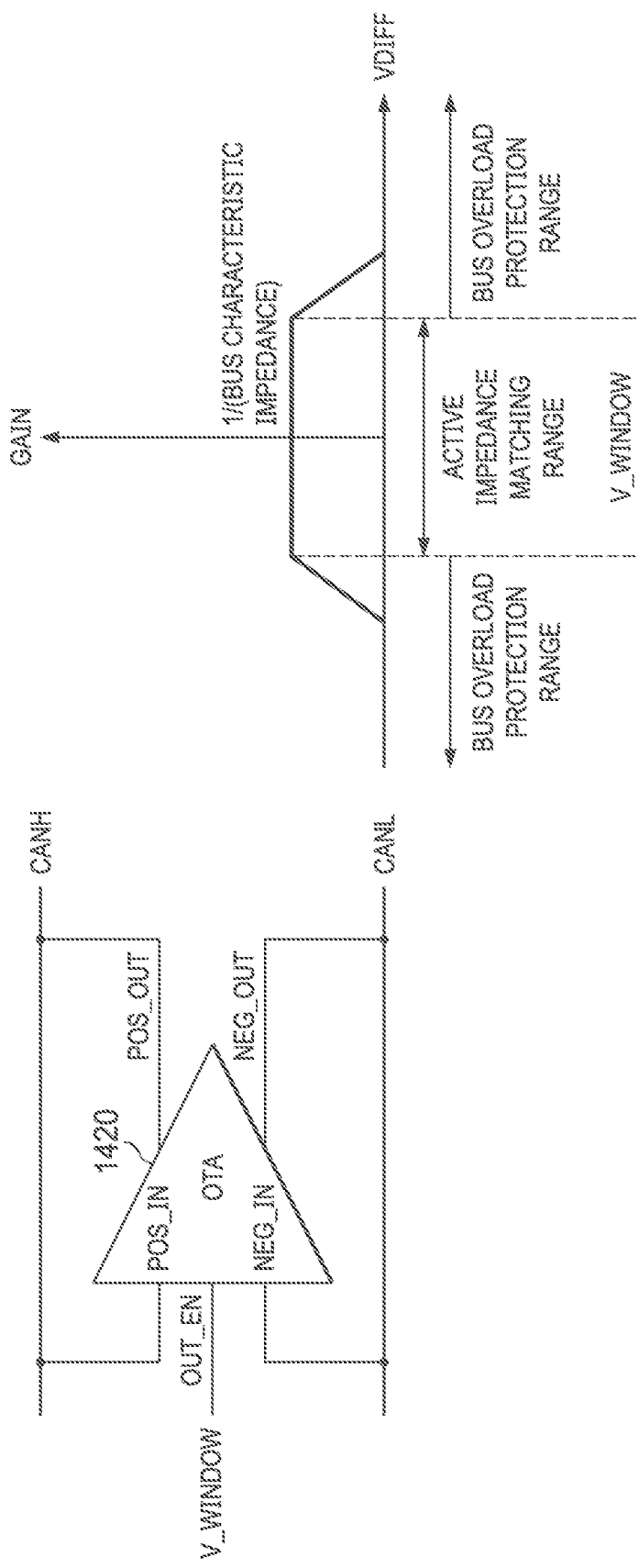
FIG. 14 illustrates a schematic diagram and gain characteristics of an OTA used for CAN bus impedance matching, according to specific example embodiments of this disclosure.

Referring to FIG. 14, depicted is a schematic diagram and gain characteristics of an OTA used for CAN bus impedance matching, according to specific example embodiments of this disclosure. Two types of bus impedance matching units are enabled herein, that may be used in an integrated CAN transceiver to match transceiver output impedance to bus impedance. One of the two is a bus impedance matching unit comprising a differential input and differential output operational trans-conductance amplifier (OTA) 1420 with its gain designed to be substantially equal to 1/(bus characteristic impedance). FIG. 14 shows on the left schematic diagram how the OTA 1420 is connected to the CANH and CANL. POS_IN and NEG_IN are arranged to measure the differential voltage on the CAN bus. POS_OUT and NEG_OUT are arranged to absorb or provide current to the CAN bus when OTA 1420 is activated.

The OTA 1420 will only be active within a certain impedance matching window defined by the V_WINDOW signal (right half of FIG. 14). The V_WINDOW signal may be generated as shown in FIG. 16. When it is deactivated, the OTA 1420 should show high impedance to the CAN bus both at input and output. Furthermore, preferably the OTA 1420 circuit is designed such that its gain decreases when its differential input voltage becomes larger.

The current injected to the CAN bus by the driving node is defined by the differential bus voltage and differential bus resistance. When multiple nodes are doing impedance matching at the same time, the total differential bus resistance decreases. The current injected to the bus increases in turn. The increased current from the driving node may lead to issues like over temperature shutdown at the driving node. With the OTA based bus impedance matching, the gain of the OTA starts to decrease when the bus differential voltage increases, as shown in FIG. 14. This is equivalent to an increase of bus impedance matching resistance and it avoids decreasing of total bus differential resistance too much. The current injected by the driving node is therefore limited as soon as the bus differential voltage reaches a level and over temperature issue on the driving node can be avoided.

This feature may be used to passively protect the CAN bus driving node from overloading when multiple nodes are doing bus impedance matching and one node is trying to drive the bus to dominant status. The performance of the bus impedance matching unit, however, will also decrease in this case, as bus impedance matching is damped when the input differential voltage becomes high. Therefore, the performance of bus impedance matching and the level where to start decreasing the gain of the OTA and how quick the gain is decreasing (as shown in FIG. 14) becomes a trade-off in the design.

Figure 15:
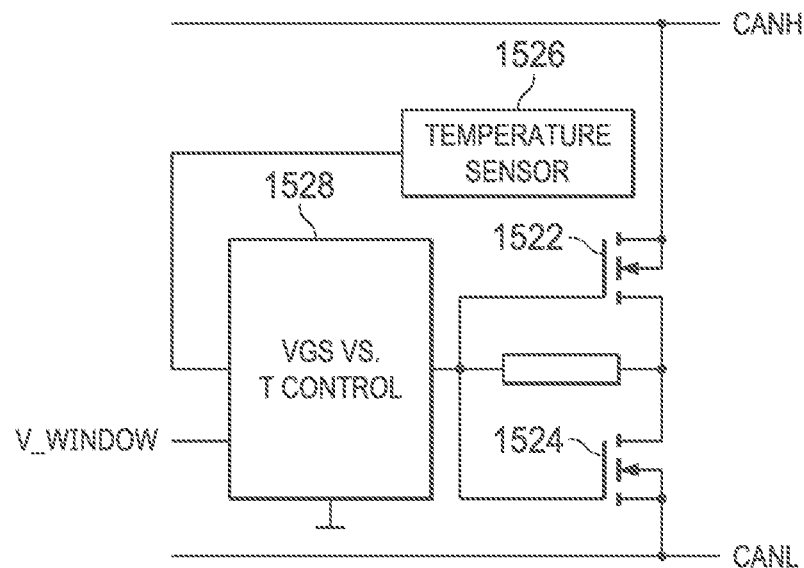
FIG. 15 illustrates a schematic block diagram of a circuit for a gate regulated back-to-back connected transistor pair for CAN bus impedance matching, according to specific example embodiments of this disclosure.

Referring to FIG. 15, depicted is a circuit for gate regulated back-to-back connected transistor pair for CAN bus impedance matching, according to specific example embodiments of this disclosure. FIG. 15 shows a gate regulated back-to-back connected transistor pair 1522, 1524 for bus impedance matching. The back-to-back connected transistor pair 1522, 1524 preferably will have a total Rory equal to the bus characteristic impedance when they are activated. The temperature sensor 1526 provides the temperature information of the transistor pair 1522, 1524 to the gate voltage control block 1528, where the temperature compensation may be done. RON of transistor pair 1522, 1524 has a defined temperature coefficient, which is known in design. By controlling the gate voltage of transistor pair 1522, 1524; the temperature coefficient can be compensated. For instance, to compensate a positive temperature coefficient of transistor RON, the gate voltage needs to be increased correspondingly with the increase of temperature. The transistor pair 1522, 1524 are only activated in the impedance matching window which is defined by the V_WINDOW signal as shown in FIG. 14, and whose generation is described further hereinbelow.

Referring to FIG. 16, depicted is a schematic block diagram of an impedance matching window generation circuit, according to specific example embodiments of this disclosure. The impedance matching window (V_WINDOW signal) may be defined based on a driver unit control signal. This driver unit control signal may be derived from, for instance is but not limited to, the VGATE_CTRL signal shown in FIG. 1.

Figure 11:
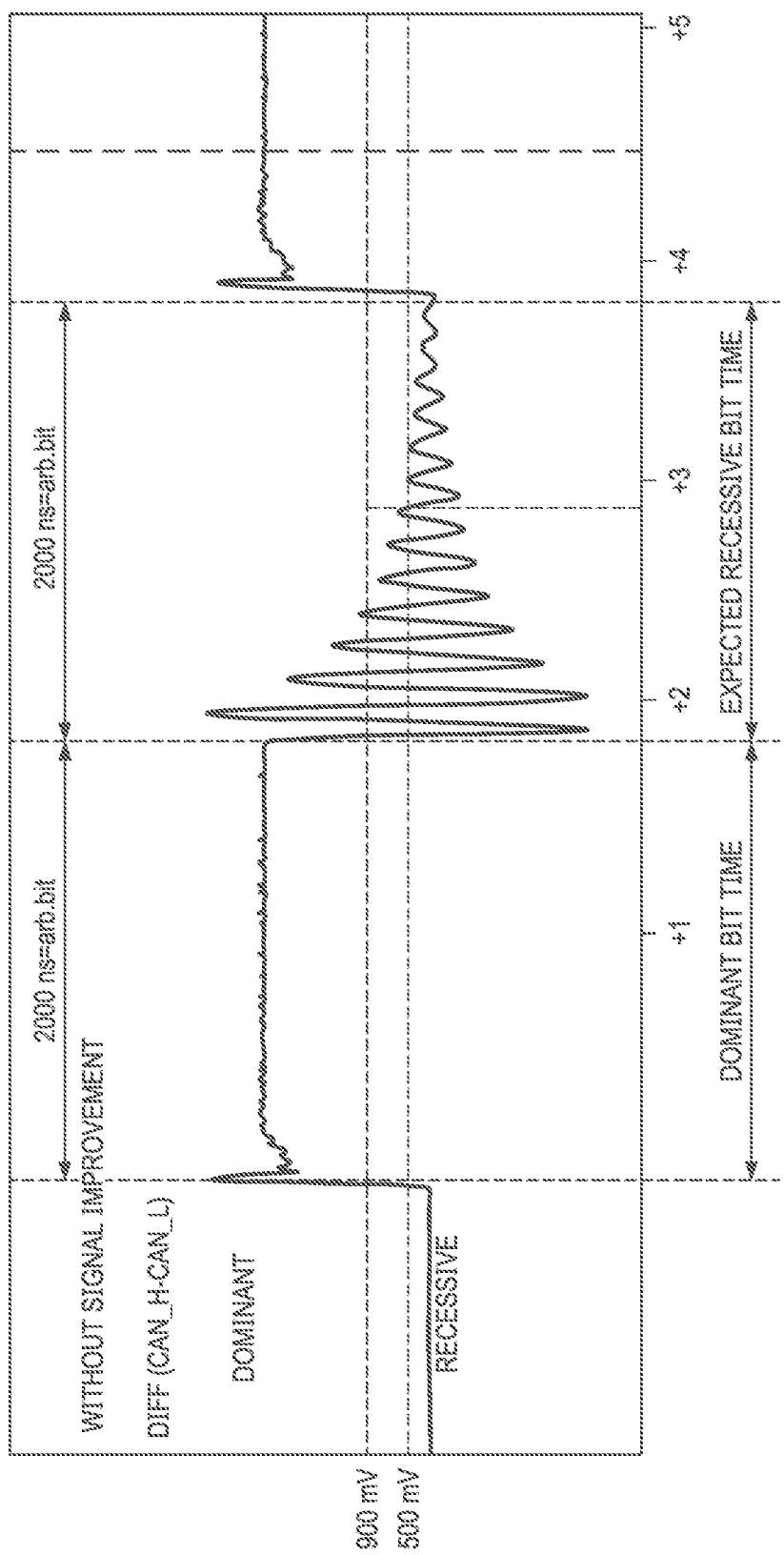
FIG. 11 illustrates signal waveforms showing ringing on a CAN bus.

The "bus_sr_ctrl_start" signal corresponds to the bus driver control input signal. Referring back to FIG. 12 or 13, it is, for instance, the "VGATE_LOGIC" signal. The VGATE_CTRL may be tied to bus_sr_ctrl_start. bus_sr_ctrl_end is the output of the last delay stage in FIG. 11 and FIG. 12. I design, the VGATE_CTRL signal may also be replaced by any internal signal indicating the start of dominant to recessive transition. When this signal changes from high to low, slew rate control will start. The "bus_sr_ctrl_end" signal is the latest slew-rate control signal. As shown in FIGS. 12 and 13, this is the control signal for the last current source or transistor switch. The delay element inserted into the "bus_sr_ctrl_end" signal in FIG. 16 may be used to extend the bus impedance matching window versus the slew rate control window.

Referring to FIG. 17, depicted is a schematic signal waveform timing diagram of the impedance matching window generation circuit shown in FIG. 16, according to specific example embodiments of this disclosure. FIG. 17 shows the corresponding signal timing diagram of the related signals generated in the impedance matching window generation circuit shown in FIG. 16. Both slew rate control and bus impedance matching can be applied combined or they may be applied individually. The extra delay may be applied if bus impedance matching is active for another time delay (tdel) after slew rate control is completed.

The solution enable herein utilizes slew-rate control to suppress ringing on the CAN bus which is a completely different way compared to the prior art impedance matching based techniques. This method, system and apparatus does not change bus differential impedance, while all known impedance matching based techniques do. This method, system and apparatus for substantially suppressing CAN bus ringing minimizes impact to the CAN bus communication and prevents driving node overload in the case of bus driving during ringing suppression. The bus drive slew rate control according to the teachings of this disclosure, preferably split the original bus driver into N smaller drivers in parallel and control them successively during ringing suppression. No additional driver or impedance matching components are needed, which may lead to a more cost-effective solution.

Disclosed herein are differential input and differential output OTA and a gate controlled back-to-back connected transistor pair for doing bus impedance matching. Compared to any resistor-based termination (see FIGS. 7-9), the proposed methods, systems and apparatus support more flexible control of the CAN bus matching impedance on the fly. For instance, it can be more stable and accurate over the whole temperature range, as temperature compensations can be applied by taking temperature information into account. The matching impedance can also be shaped versus differential bus voltage, which may be used to passively prevent overload on a driving node or for other purposes. The CAN bus impedance matching method, system and apparatus disclosed and claimed herein is preferably applied only for defined time windows during and after bus status transiting from dominant to recessive state, thereby avoiding continuously loading the CAN bus.

The present disclosure has been described in terms of one or more embodiments, and it should be appreciated that many equivalents, alternatives, variations, and modifications, aside from those expressly stated, are possible and within the scope of the disclosure. While the present disclosure is susceptible to various modifications and alternative forms, specific example embodiments thereof have been shown in the drawings and are herein described in detail. It should be understood, however, that the description herein of specific example embodiments is not intended to limit the disclosure to the particular forms disclosed herein.

What is claimed is:

1. A method for reducing ringing on a controller area network (CAN) bus, said method comprising the steps of:
    providing a CAN transceiver having a CAN bus driver coupled to a CAN bus, and
    matching impedance of the CAN bus with an impedance matching unit, wherein the impedance matching unit comprises an operational transconductance amplifier (OTA) and wherein the OTA comprises differential inputs coupled to the CAN bus and differential outputs coupled to the CAN bus.

2. The method according to claim 1, comprising:
    Connecting the impedance matching unit to the CAN bus when the CAN bus driver is in a CAN bus dominant state and
    disconnecting the impedance matching unit from the CAN bus when the CAN bus driver is in a CAN bus recessive state.

3. The method according to claim 1, comprising:
    coupling the impedance matching unit to the CAN bus during and for a short time after the CAN bus driver transitions from driving the CAN bus from a CAN bus dominant state to a CAN bus recessive state.

4. A method for reducing ringing on a controller area network (CAN) bus, said method comprising the steps of:
    providing a CAN transceiver having a CAN bus driver coupled to a CAN bus, and
    matching impedance of the CAN bus with an impedance matching unit, wherein the impedance matching unit comprises a back-to-back connected Rory regulated transistor pair and a gate control circuit.

5. The method according to claim 4, comprising:
    connecting the impedance matching unit to the CAN bus when the CAN bus driver is in a CAN bus dominant state and disconnecting the impedance matching unit from the CAN bus when the CAN bus driver is in a CAN bus recessive state.

6. The method according to claim 4, comprising:
coupling the impedance matching unit to the CAN bus during and for a short time after the CAN bus driver transitions from driving the CAN bus from a CAN bus dominant state to a CAN bus recessive state.

7. A method for reducing ringing on a controller area network (CAN) bus, said method comprising the steps of:
providing a CAN transceiver having a CAN bus driver coupled to a CAN bus, wherein the CAN bus driver comprises slew rate control, and
matching impedance of the CAN bus with an impedance matching unit, and further comprising the step of controlling CAN bus driver slew rate within said CAN bus driver so as to reduce high frequency signals on the CAN bus.

8. The method according to claim 7, wherein the step of controlling CAN bus driver slew rate comprises the step of successively disabling a plurality of current sources comprising the CAN bus driver.

9. The method according to claim 8, wherein the step of successively disabling the plurality of current sources comprises providing a plurality of delay lines coupled in series and to respective ones of the plurality of current sources, wherein a disable signal is delayed through each one of the plurality of delay lines and to the respective ones of the plurality of current sources.

10. The method according to claim 7, wherein the step of controlling CAN bus driver slew rate comprises the step of successively opening a plurality of parallel connected resistive switches comprising the CAN bus driver.

11. The method according to claim 10, wherein the step of successively opening the plurality of resistive switches comprises providing a plurality of delay lines coupled in series and to respective ones of the plurality of resistive switches, wherein a disable signal is delayed through each one of the plurality of delay lines and to the respective ones of the plurality of resistive switches.

12. A system for reducing ringing on a controller area network (CAN) bus, said system comprising:
a CAN SIC (Signal Improvement Capability) transceiver having a CAN bus driver coupled to a CAN bus, and
an impedance matching unit selectively coupled to the CAN bus, wherein the impedance matching unit comprises an operational transconductance amplifier (OTA) comprising differential inputs coupled to the CAN bus and differential outputs coupled to the CAN bus.

13. The system according to claim 12, wherein the impedance matching unit is selectively coupled to the CAN bus during and for a short time after a CAN bus driver transitions from driving the CAN bus from a dominant state to a recessive state.

14. A system for reducing ringing on a controller area network (CAN) bus, said system comprising:
a CAN SIC (Signal Improvement Capability) transceiver having a CAN bus driver coupled to a CAN bus, and
an impedance matching unit selectively coupled to the CAN bus, and
a slew rate circuit for controlling the CAN bus driver slew rate, whereby high frequency signals on the CAN bus are reduced.

15. The system according to claim 14, wherein the slew rate circuit comprises:
a plurality of current sources coupled in parallel; and
a plurality of delay lines coupled in series and to respective ones of the plurality of current sources, wherein an enable signal is delayed through each one of the plurality of delay lines and to the respective ones of the plurality of current sources.

16. The system according to claim 14, wherein the slew rate circuit comprises:
a plurality of resistive switches coupled in parallel; and
a plurality of delay lines coupled in series and to respective ones of the plurality of resistive switches, wherein an enable signal is delayed through each one of the plurality of delay lines and to the respective ones of the plurality of resistive switches.

17. A system for reducing ringing on a controller area network (CAN) bus, said system comprising:
a CAN SIC (Signal Improvement Capability) transceiver having a CAN bus driver coupled to a CAN bus, and
an impedance matching unit selectively coupled to the CAN bus, wherein the impedance matching unit comprises a back-to-back connected Rory regulated transistor pair and a gate control circuit.

18. The system according to claim 17, wherein the impedance matching unit is selectively coupled to the CAN bus during and for a short time after a CAN bus driver transitions from driving the CAN bus from a dominant state to a recessive state.

19. The system according to claim 17, wherein the back-to-back connected RON regulated transistor pair comprises a first MOSFET having a source drain path coupled in series with a drain source path of a second MOSFET, wherein a gate of the first MOSFET is coupled with a gate of the second MOSFET.

20. An apparatus for reducing ringing on a controller area network (CAN) bus, comprising:
a CAN bus driver for driving a CAN bus,
an impedance matching unit for selectively coupling to the CAN bus, where the impedance matching unit comprises an operational transconductance amplifier (OTA), and
a slew rate circuit for controlling CAN bus driver slew rate.

21. The apparatus according to claim 20, wherein the impedance matching unit comprises a back-to-back connected Rory regulated transistor pair and a gate control circuit.

22. The apparatus according to claim 21, wherein the back-to-back connected RON regulated transistor pair comprises a first MOSFET having a source drain path coupled in series with a drain source path of a second MOSFET, wherein a gate of the first MOSFET is coupled with a gate of the second MOSFET.

23. The apparatus according to claim 22, wherein the slew rate circuit comprises:
a plurality of current sources coupled in parallel; and
a plurality of delay lines coupled in series and to respective ones of the plurality of current sources, wherein a disable signal is delayed through each one of the plurality of delay lines and to the respective ones of the plurality of current sources.

24. The apparatus according to claim 22, wherein the slew rate circuit comprises:
a plurality of resistive switches coupled in parallel; and
a plurality of delay lines coupled in series and to respective ones of the plurality of resistive switches, wherein a disable signal is delayed through each one of the plurality of delay lines and to the respective ones of the plurality of resistive switches.

\* \* \* \* \*